May 30, 1939. A. L. EMENS 2,160,415
MAXIMUM-DEMAND METER
Filed Feb. 6, 1937
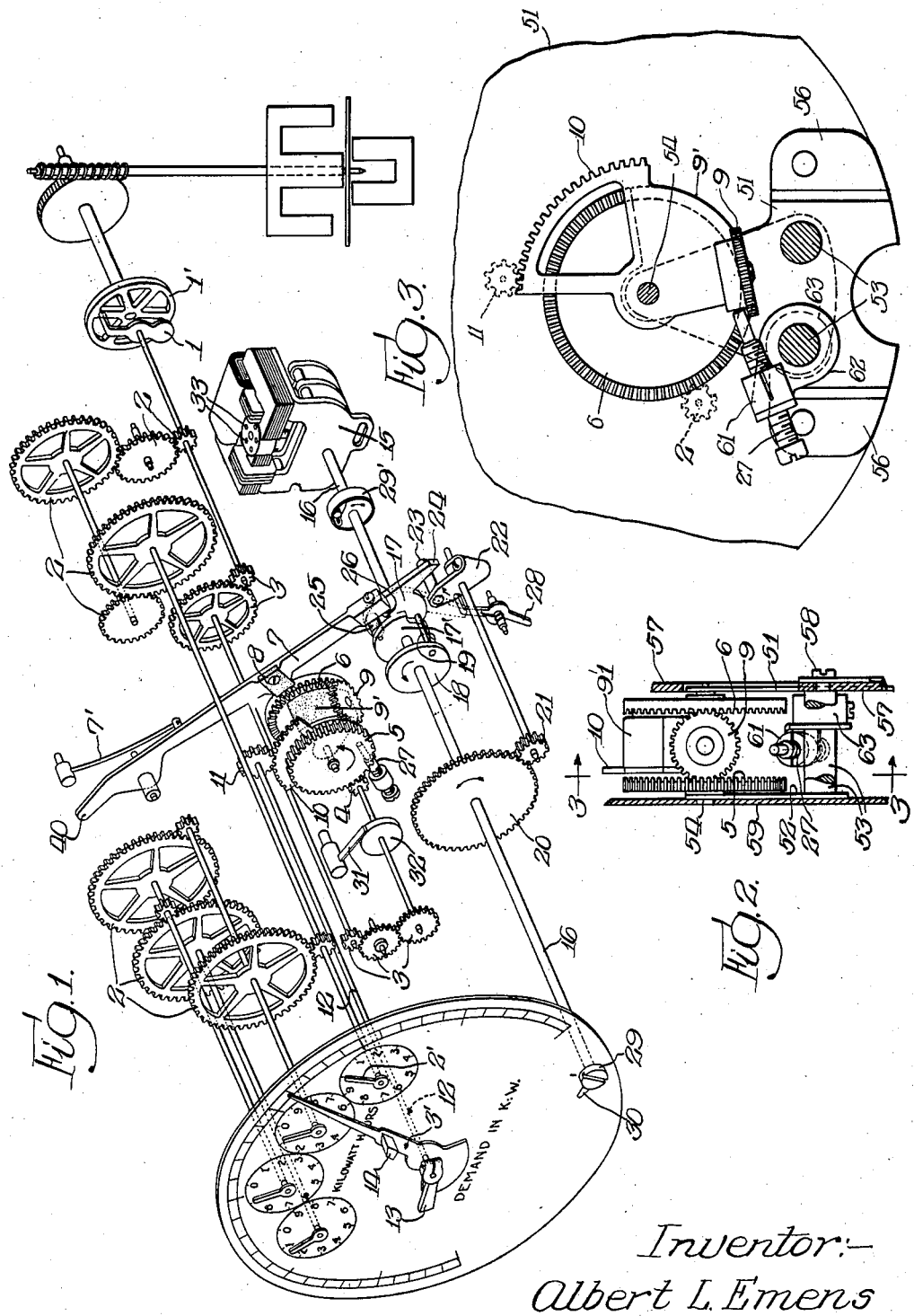
Inventor:—
Albert L. Emens
By Louis Robertson Atty.

Patented May 30, 1939

2,160,415

UNITED STATES PATENT OFFICE 2,160,415

MAXIMUM-DEMAND METER

Albert L. Emens, La Fayette, Ind., assignor to Duncan Electric Manufacturing Company, La Fayette, Ind., a corporation of Illinois Application February 6, 1937, Serial No. 124,363

5 Claims. (Cl. 171—34)

This invention relates to maximum demand meters and particularly to maximum demand registers for inclusion in watt-hour meters.

The type of watt-hour meter with which most people are familiar is an ordinary integrating meter such as is commonly used for measuring the consumption of electric energy in homes. Such a meter has an integrator including four small hands each of which indicates one digit of the meter reading. With some rate systems it is necessary to have another indicator which is set back to zero each time the meter is read and indicates the maximum demand between meter readings. By maximum demand is meant the highest average rate of power consumption during any measuring period of, for example, one-half hour. This period is known as the demand interval and may be of any predetermined length. The theory behind the maximum demand system of charges is that a consumer's maximum demand determines the amount of equipment which the utility company must have ready to supply his demand. The consumer should be charged something for the equipment that he occasionally requires even if his total monthly current consumption is low.

To provide the maximum demand indication it has been common practice to provide a register in which, besides the usual small integrating pointers, there is an additional large pointer, usually called the sweephand, which shows the maximum demand. This sweephand is so mounted that it stays in any position to which it is moved. It is moved forward by a pusher element which starts from zero at the beginning of each demand interval or measuring period, such as thirty minutes. If during any demand interval the power consumption is great enough, this pusher element will be rotated until it engages the maximum demand pointer and pushes it a little further to show a still higher demand than there has been previously. On the other hand, if the demand is less than there had been previously, the pusher element will not reach the demand pointer during the demand interval and at the end thereof will be automatically returned to zero to start its measurement for a new demand interval. When the meter is read, as at the end of a month, the reader will note not only the kilowatt hour indications of the integrating pointers but also the kilowatt indication of the maximum demand sweephand and will then turn the maximum demand pointer to zero so that it will be moved by the pusher element to indicate the maximum demand between the time of resetting and the next meter reading.

There have been various arrangements for returning the pusher element to zero at the end of each demand measuring period. In commercial practice there have been various types of mechanisms in which the pusher element was periodically zeroized by a spring wound up by the timing motor. Some of these have given fairly satisfactory service on the whole but for a variety of reasons have not been entirely satisfactory or have been too complicated if they were satisfactory. Besides possible trouble with the springs there was an inherent difficulty in the danger that the timing motor would not be accurate when subjected to the load of the spring.

As disclosed in the Harris Patent No. 1,536,097, granted May 5, 1925, there was invented an improved form of mechanism which utilized a differential gearing arrangement in which the demand pusher element was actuated through a driving (side) gear and the driven planetary pinion of the differential while the other side gear (reaction gear) of the differential was restrained by a dog engaging teeth thereon during the demand interval. At the end of the demand interval the dog was automatically released to release the differential gear so that the demand pusher element was permitted to return to zero under the influence of the weight of the planetary portion of the differential mechanism. There was also provided an actuating lug for releasing the dog which, though making only one revolution in the relatively long demand measuring period, was accelerated during the operative portion of its cycle so as to release the dog quickly and accurately at the end of the thirty minute interval.

The present invention utilizes the principles of this Harris invention and, therefore, is to be considered as an improvement thereon. One improved feature is in providing a little more exact measurement by substitution of a brake type of holding means for the dog and gear holding means. A further improvement is in substantially eliminating backlash effects. Another improvement is in general simplification of the construction to facilitate manufacture and to provide a construction which is more certain to be free from trouble. For example, the present construction includes no springs of a nature likely to give trouble, and the accelerated brake releasing member is not biased to spring back after being freed from the accelerating means.

From the foregoing it will be evident that the objects of the invention are in general to utilize the principles of the Harris Patent, No. 1,536,097, in an improved form and hence to provide a more satisfactory maximum demand meter than has heretofore been known.

Further objects and advantages of the invention will be apparent from the following description and from the drawing, in which:

Fig. 1 is a diagrammatic view of one form of meter constructed in accordance with the present invention, the register being shown in perspective.

Fig. 2 is a fragmentary detail view of the differential mechanism shown in Fig. 1, showing its mounting in the register frame, and Fig. 3 is a fragmentary sectional view taken substantially on the line 3—3 of Fig. 2.

Although this invention may take numerous forms, only one has been chosen for the purpose of illustration. In order to show the invention more clearly it has obviously been spread out in Figure 1 by greatly elongating the shafts. In practice the entire structure shown in Fig. 1 would be carried by a plurality of spaced apart parallel plates which in turn could be mounted on the meter mechanism as in the prior art. According to one practice that has been common in the past the register is provided with a dog 1 arranged to mesh with the spokes of a driving wheel 1' on the worm wheel shaft of the meter when the register is secured to the meter mechanism. By means of this dog the kilowatt hour gear train 2 is driven, this train in turn driving the integrator hands 2' from which the ordinary reading of the meter in kilowatt hours is taken. The dog 1 also drives a gear train 3 for driving the demand pusher element 13 which pushes a sweephand 3' to the point of highest demand during the measuring.

The demand pusher element 13 must be returned to its zero position at the end of each demand interval of say thirty minutes. As was taught in the Harris Patent No. 1,536,097, this can be accomplished by driving the pusher element through a differential, one side of which is normally held fixed but is released at the end of the demand interval to permit the pusher element to return to the zero position to which it is biased. The driving of the pusher element 13 in its forward direction can be seen clearly from Fig. 1. The demand train 3 drives the pinion 4 which meshes with and drives the driving gear 5 of the differential. In normal (forward driving) operation the reaction gear 6 of the differential is held in fixed position by a brake arm 7 which has a shoe 8 resting on the circumference of the reaction gear 6. As the gear 5 is rotated in the direction indicated by the arrow thereon, it rotates the pinion 9, thus driving it upwardly along the fixed gear 6. The pinion 9 is mounted in fixed relation with a sector 10 which is therefore rotated in a counterclockwise direction, as seen in Fig. 1, as the pinion 9 is rolled upwardly on the fixed gear 6. The sector 10 drives the pinion 11 which is solidly mounted on the shaft 12 as is also the pusher element 13. It is thus evident that the pinion 4 normally drives the pusher element 13 in a forward clockwise direction through the differential mechanism 5, 6, 9 and 10. Unless the sweephand 3' is already in an advanced position, the pusher element 13 will engage the lug 14 on the sweephand 3' and push the sweephand 3' to the most advanced position reached by the pusher element 13.

At the end of the demand interval or, in other words, after the pusher element 13 has been driven forwardly for say thirty minutes, the brake arm 7 is raised in a manner described hereinafter thus releasing the side wheel 6 of the differential mechanism so that it may rotate freely. As described in detail hereinafter, this permits the pinion 9 and sector 10 to move in a clockwise direction under influence of weight 9', thus rotating the pinion 11 and driving the pusher element 13 in a reverse direction back to the zero position.

The brake arm 7 is raised to permit the zeroizing of the pusher element every thirty minutes (or at the end of each demand interval of some other duration) by a compound release mechanism driven by a driving motor 15, which is preferably of the synchronous type. If the register is designed for a thirty minute demand interval, the shaft 16 will make one revolution in thirty minutes, being driven by suitable speed reducing gearing in the motor unit 15.

When a shaft makes only one revolution in thirty minutes it is not desirable to have it directly release a brake or other lock arm in the type of mechanism shown since its speed is so slow that it would be difficult to time both the release and the subsequent reengagement exactly in order to have an accurately timed demand interval. Furthermore, it would be difficult to reduce the interval between the release and the reengagement of the brake to a minimum so as to avoid loss of measuring time. The general principle of the solution of the problem was taught by the Harris Patent No. 1,536,097, above mentioned, in which the release element making one revolution in a demand interval was provided with lost motion and a faster moving kicker element was provided for speeding up the movement of the slow moving release element during the vital part of its cycle in which the release and subsequent reengagement of the differential locking arm was accomplished. The present invention utilizes the same principle, though embodying it in a somewhat different construction.

The actual release is accomplished by a roller 25 which is carried between plates 17 and 17' which are loosely mounted on the shaft 16, being free to rotate thereon within certain limits. The roller 25 engages the lower end of an adjustable pin 26. Plates 17 and 17' are driven through most of their cycle by a wheel 18 fixedly mounted on the shaft 16 and by a pin 19 carried by the wheel 18 and engaging the plate 17'. The pin 19 operates in a recess in the plate 17' which determines the limited movement of the plate 17' with respect to the shaft 16. Since the plate 17, the plate 17' and the roller 25 act jointly as a cam, it may be convenient to refer to them as the cam 17—17'.

The shaft 16 carries a large gear 20 and through it drives a pinion 21 which in turn drives the fast moving arm 22. The ratio of the gears 20 and 21 is such as to cause the fast moving arm 22 to revolve nine revolutions while the slow moving cam 17—17' revolves one revolution. The fast moving arm 22 carries a roller 23 which engages an arm 24 on the plate 17. When the fast moving roller strikes the arm 24 it advances the cam 17—17' on the shaft 16 at a fairly high speed comparable to that of the fast moving arm 22. As this takes place, the roller 25 on the cam 17—17' is quickly forced ahead, and at an accurately predetermined time raises the pin 26. This raises the brake arm 7 so that the shoe 8 is separated from the differential side gear 6, thus permitting the pusher element 13 to return to zero, as mentioned heretofore. The roller 25 continues its temporary relatively fast movement and within a few seconds passes from under the pin 26 so that the brake arm 7 is driven by the spring 7' back to its normal position with the shoe 8 again engaging the differential side gear 6. The register is now ready to repeat its former operation, the pusher element 13 again being driven forwardly through the differential 5, 6, 9 and 10 and the demand train 3.

Since the roller 23 advances the cam 17—17' with respect to the slow moving shaft 16, it is necessary that before this advance the cam 17—17' must be in a retarded or lagging position. This is insured by means of the dog 28 which may be described as a "get ready" mechanism. It is supported by the frame of the register in a position to be struck by the arm 24 on plate 17 to provide a temporary drag and insure that the cam 17—17' is in its most retarded position with respect to the shaft 16, i. e. the position in which it is positively driven by the pin 19. The "get ready" mechanism or drag element 28 may have its drag increased by a spring as illustrated, and in that event a stop, not shown, will normally be provided to limit the biased pivotal movement of the drag element 28 to the position at which it will be struck by the arm 24. The "get ready" mechanism including the drag element 28 not only insures that the release mechanism will operate but also insures that it will operate accurately on the proper revolution of the fast moving arm 22.

The interval during which the brake is released can be determined quite accurately by the adjustment of the pin 26. It is of course necessary that this release interval be accurate in order that the demand measuring interval which comprises the remainder of the period of the revolution of the shaft 16 shall also be accurate. In this connection it should be pointed out that it is very desirable that the brake shoe 8 as well as the side pinion 6 be of a relatively non-wearing material in order that the initial adjustment of the pin 26 will remain accurate through a long period of service. This presents some problems since it is desirable that the contact between the shoe 8 and the gear 6 have a high coefficient of friction and that both be non-corrosive. The problem has been solved by choosing two metals which, when in contact, have a high coefficient of friction, tin for the brake shoe 8 and brass for the gear 6 having been found to be satisfactory.

The shaft 16 carries a screw 29 having several functions. Its more important service is to save time in testing the register. If this screw is turned counterclockwise, the timing mechanism is advanced, the rotation of the screw 29 and the shaft 16 being permitted by an overrunning clutch in the motor mechanism indicated at 29'. By observing the position of the pointer 30 with respect to a suitable marker the timing mechanism can be advanced to within a few seconds of the resetting operation so that the automatic reset will take place naturally but without having to wait long for it. Another advantage of this construction is that two or more registers may be set so that their time intervals coincide, and the pointer 30 may be used to indicate the correctness of the timing motor if no neon lamp is available to check the time stroboscopically.

The quickest and most accurate way to test the speed of the motor is stroboscopically, preferably by the aid of a small neon lamp. The top of the rotor is provided with stroboscopic markings 33, as clearly seen in Fig. 1, which seem to stand still when viewed in an intermittent light of the proper frequency, if the motor is running at the proper speed.

When the brake shoe 8 is raised in the manner previously described to release the side gear 6 of the differential mechanism, the sector 10 and the gear 9 are caused to move jointly in the clockwise direction by means of a weight 9' which may desirably comprise the yoke on which pinion 9 and sector 10 are mounted. In order to have sufficient weight to operate with certainty this yoke may be of lead and approximately of the size illustrated. This yoke or weight is raised up when the pinion 9 is rolled upwardly on the fixed gear 6 to drive the pusher element 13 forwardly. When the normally fixed gear 6 is released, it rotates freely to permit the weight 9' to roll the pinion 9 downwardly on the gear 5, thus returning the pointer 13 to the zero position. The return movement of the pinion 9 and consequently of the pointer 13 is limited by an adjustable screw 27 carried by the register frame. The end of the screw 27 is preferably positioned to engage the hub of the pinion 9 as seen in Fig. 2 so as to not only stop its downward movement but also to help stop its rotative movement. The purpose of this is to guard against backlash effects due to the momentum of the side wheel 6 which is rotated as the pinion 9 drops downwardly. Backlash effects may further be guarded against by providing a friction brake 31 engaging a brake wheel 32 driven with the pinion 4. This prevents any backlash effect from being extended into the gear train 3.

*Constructional features*

It will be observed that the differential unit is in a sense the heart of this register in that it must be free from serious defects for the register to function properly, and it is a relatively delicate mechanism which requires special manufacturing care. According to one feature of this invention the differential mechanism is therefore provided as a separate unit easily added to the rest of the register and mounted in such a way as to be free from distortion by imperfections in the rest of the register.

The differential unit is made up separately between the two small frame plates 51 and 52 which are secured together by posts 53 (Fig. 3) and shaft 54. The plate 51 is provided with offset ears 56 adapted to be secured to a rear plate 57 of the register as by screws 58. The rear plate 57 is cut out to the approximate shape of the upward extension of plate 51 which may therefore lie in the plane of plate 57. To steady the upper portion of the differential unit the shaft 54 may spring into a hole in plate 59 of the register, providing a three point suspension.

The parts of the register engaged by the differential gears are so positioned as to permit the differential unit as a whole to be slipped into a register which is otherwise complete, the unit then being secured by screws 58. It will be evident that this permits the differential unit to be carefully tested separately. If it were simply built up as a normal part of the register the whole register would have to be rejected if the differential mechanism were defective.

The pin 27 is included as a part of the differential unit. It is carried by an internally threaded split collar 61 which resiliently engages it to avoid backlash and insure permanence of adjustment. The collar 61 may be secured to a bracket 62 including a collar 63 on post 53 to which it may be locked by a suitable set screw.

From the foregoing description of the various features of the invention it is seen that a thoroughly satisfactory, dependable and economical register is provided which utilizes the principles of the Harris patent above mentioned and which, furthermore, is free even from the slightly inaccuracy of a pawl and cog differential lock and substantially free also from backlash. Excessive manufacturing difficulties in connection with the differential unit mechanism are avoided.

The register is so designed that no steel or iron need be used in the register proper at any point. The parts may be of brass, nickel-steel, phosphor bronze, aluminum, zinc die castings, pure lead, and like materials. The result is that the register does not carry into the meter any magnetic particles to be picked up by the permanent magnets. Of course, the motor may have highly polished nickel-steel worm wheels and highly polished carbon steel worms but these parts may be enclosed within a die cast gear housing which also serves as an oil reservoir.

The register is also admirably designed to facilitate testing. A complete inspection of the functioning of the register can be made within thirty seconds, assuming the meter is under load and the cover off. If the gear ratios are to be tested, the time required is about one minute additional. No special gadgets or test equipment of any kind are required.

The cover reset for the sweephand 3' may be of the manual type such as that disclosed in applicant's copending application Serial No. 595,804. The cumulator features of that application for cumulating successive demand indications as the sweephand is reset may also be included.

The disclosures of this application are illustrative and the invention is not to be limited by them. In fact, if modifications or improvements are not at once obvious, they may be devised in the course of time to make additional use of the broad ideas taught and covered by this application. The claims are intended to point out novel features and not to limit the invention except as may be required by prior art.

I claim:

1. A maximum demand register for watt-hour meters including a maximum demand indicator, a pusher element therefor, means for moving said pusher element forwardly including a differential mechanism having a planetary gear in geared relationship to said pusher element and two side gears, means for normally restraining one of said side gears and for releasing it periodically to permit said pusher element to move backwards, means for biasing said pusher element in the backward direction, and a member positioned to be struck by a rotating portion of said planetary gear to stop both its planetary movement and its rotative movement whereby said pusher element is stopped at the zero position and backlash effects are reduced.

2. A maximum demand register for watt-hour meters including a maximum demand indicator, a pusher element for moving said indicator forwardly, a differential gear mechanism including a planetary portion constantly geared to said pusher element and opposed side gears geared to said planetary element, means for normally restraining one of said side gears but at times releasing it, biasing means effective at such times to return said pusher element to the zero position, means for stopping said pusher element at the zero position, gearing for transmitting driving force from the meter motor to the other of said side gears, and friction means effective as to the gear driving said last named side gear for preventing backlash effects due to the momentum of the parts in the backward movement of the pusher element from being transmitted into said gearing.

3. A maximum demand register for watt-hour meters including a maximum demand indicator, a pusher element therefor biased for rearward movement, means for driving said pusher element forwardly including a differential gear mechanism, means for normally restraining one member of said differential gear mechanism, and means for periodically releasing said restraining means including a motor, actuating means driven relatively slowly but with lost motion by said motor, accelerating means adapted to move said actuating means with accelerated speed during the active part of its cycle, and relatively stationary drag means for insuring that the slow driving means for said actuating means has caught up with said actuating means to render said lost motion available at the time that said actuating means is to be accelerated by said accelerating means.

4. A maximum demand register for watt-hour meters including a maximum demand indicator, a pusher element therefor biased for rearward movement, means for driving said pusher element forwardly including a differential gear mechanism, means for normally restraining one member of said differential gear mechanism, and means for periodically releasing said restraining means; said differential gear mechanism being mounted in a separate frame from the remainder of the register and being readily securable thereto in operative relation in a manner to render the separate frame independent of inaccuracies and distortions in the rest of the register and removable therefrom.

5. A maximum demand register for watt-hour meters including a maximum demand indicator, a pusher element therefor biased for rearward movement, means for driving said pusher element forwardly including a differential gear mechanism, means for normally restraining one member of said differential gear mechanism, and means for periodically releasing said restraining means including a motor, an actuator rotated about a fixed axis by the motor and a release lever having a contact portion normally within the path of the actuator to be actuated by said actuator and moved out of said path by it, said contact portion being relatively adjustable as to the extent which it projects into the path of the actuator to accurately time the duration of the release.

ALBERT L. EMENS.